(12) United States Patent
Schoenek

(10) Patent No.: US 8,241,161 B2
(45) Date of Patent: Aug. 14, 2012

(54) HYBRID MODULE FOR INTERCONNECTING AN ENGINE AND A TRANSMISSION

(75) Inventor: Noman Schoenek, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 559 days.

(21) Appl. No.: 12/483,535

(22) Filed: Jun. 12, 2009

(65) Prior Publication Data

US 2010/0317476 A1 Dec. 16, 2010

(51) Int. Cl.
*F16H 3/72* (2006.01)
(52) U.S. Cl. .......................................... 475/5
(58) Field of Classification Search .............. 475/5, 150, 475/311, 330, 269
See application file for complete search history.

(56) References Cited

U.S. PATENT DOCUMENTS

| 5,364,320 A * | 11/1994 | Ra et al. ........................ 475/280 |
| 7,559,864 B2 * | 7/2009 | Maeda et al. ..................... 475/5 |
| 8,056,663 B2 * | 11/2011 | Schoenek ..................... 180/65.6 |

* cited by examiner

*Primary Examiner* — David D Le
*Assistant Examiner* — David J Hlavka
(74) *Attorney, Agent, or Firm* — Quinn Law Group, PLLC

(57) ABSTRACT

A hybrid module is configured to interconnect an engine and a transmission. The hybrid module includes an electric motor and a first and second carrier. The first carrier is operatively connected to the transmission and is rotatable about the central axis at a first rotational velocity with the electric motor. The first carrier transfers the first rotational velocity to the transmission. The second carrier is operatively connected to the engine and is rotatable about the central axis at a second rotational velocity. A first sun gear rotatably surrounds the central axis and is connected to the second carrier. A first pinion gear is rotatably supported by the first carrier and is in meshing engagement with the first sun gear such that the first pinion gear rotates about the first pinion axis as the first pinion gear and the first carrier rotate in unison about the central axis.

20 Claims, 3 Drawing Sheets

US 8,241,161 B2

HYBRID MODULE FOR INTERCONNECTING AN ENGINE AND A TRANSMISSION

TECHNICAL FIELD

The present invention relates to a hybrid module that is configured to interconnect an engine and a transmission for a vehicle.

BACKGROUND OF THE INVENTION

In modern vehicles, multi-speed, dual-clutch transmissions (DCT) are generally utilized for their increased mechanical efficiency in comparison with typical, torque-converter equipped automatic transmissions. Additionally, multi-speed, dual-clutch transmissions are often preferred over typical automated manual transmissions for the DCT's capability to provide higher quality gear shifts.

A typical DCT employs two friction clutches for shifting among its forward ratios, and accomplishes such shifts by alternating engagement between one and the other of the two friction clutches. Such a multi-speed, dual-clutch transmission may be utilized in a hybrid vehicle, i.e. a vehicle employing two or more distinct power sources, such as an engine and an electric motor, for transmitting propulsion energy to the subject vehicle's driven wheels. However, packaging of the DCT hardware along with the multiple power sources in a hybrid vehicle may pose a challenge.

SUMMARY OF THE INVENTION

A hybrid module is configured to interconnect an engine and a dual-clutch transmission (DCT). The hybrid module includes an electric motor, a first carrier and a second carrier. The electric motor is configured for rotation about the central axis at a first rotational velocity. The first carrier is configured for being operatively connected to the DCT and is rotatable about the central axis at a first rotational velocity. The first carrier is operatively connected to the electric motor for common rotation therewith and is configured for transferring the first rotational velocity of the first carrier to the DCT. The second carrier is configured for being operatively connected to the engine and is rotatable about the central axis at a second rotational velocity. A second pinion gear rotatably surrounds a second pinion axis in spaced and generally parallel relationship to the central axis. The first and second pinion gears are rotatably supported by the first carrier. A first sun gear rotatably surrounds the central axis. The first sun gear is rotatably connected to the second carrier and is rotatable about the central axis with the second carrier. A second sun gear rotatably surrounds the central axis. The first sun gear is in meshing engagement with the first pinion gear such that the first pinion gear rotates about the first pinion axis, relative to the first sun gear, as the first pinion, the second pinion, the first sun gear, the second sun gear, and the first carrier rotate about the central axis in unison. The first pinion gear meshes with the second pinion gear, which in turn meshes with the second sun gear.

A hybrid powertrain is configured to propel a vehicle. The hybrid powertrain includes an engine, a dual-clutch transmission (DCT); and a hybrid module. The hybrid module interconnects the engine and the DCT and includes an electric motor, a first carrier, and a second carrier. The electric motor is configured for rotation about the central axis at a first rotational velocity and is configured to be operatively connected to the DCT. The electric motor is operatively connected to the first carrier for common rotation therewith. The first carrier transfers the first rotational velocity of the first carrier to the DCT. The second carrier is operatively connected to the engine and is rotatable about the central axis at a second rotational velocity. A second pinion gear rotatably surrounds a second pinion axis in spaced and generally parallel relationship to the central axis. The first and second pinion gears are rotatably supported by the first carrier. A first sun gear rotatably surrounds the central axis. The first sun gear is rotatably connected to the second carrier and is rotatable about the central axis with the second carrier. A second sun gear rotatably surrounds the central axis. The first sun gear is in meshing engagement with the first pinion gear such that the first pinion gear rotates about the first pinion axis, relative to the first sun gear, as the first pinion, the second pinion, the first sun gear, the second sun gear, and the first carrier rotate about the central axis in unison. The first pinion gear meshes with the second pinion gear, which in turn meshes with the second sun gear.

Another aspect of the invention includes a hybrid module that is configured to interconnect an output of an engine and a dual-clutch transmission (DCT). The hybrid module includes an electric motor, a first and second carrier, a first and second sun gear, at least one first pinion gear, at least one second pinion gear, and a first and second torque transmitting device (TTD). The first carrier is configured for rotation about a central axis at a first rotational velocity. The first carrier is configured for being operatively connected to a DCT to transfer the first rotational velocity of the first carrier to the DCT. The second carrier is configured for being operatively connected to the output of the engine and rotatable about the central axis at a second rotational velocity. A second pinion gear rotatably surrounds a second pinion axis in spaced and generally parallel relationship to the central axis. The first and second pinion gears are rotatably supported by the first carrier. A first sun gear rotatably surrounds the central axis. The first sun gear is rotatably connected to the second carrier and is rotatable about the central axis with the second carrier. A second sun gear rotatably surrounds the central axis. The first sun gear is in meshing engagement with the first pinion gear such that the first pinion gear rotates about the first pinion axis, relative to the first sun gear, as the first pinion, the second pinion, the first sun gear, the second sun gear, and the first carrier rotate about the central axis in unison. The first pinion gear meshes with the second pinion gear, which in turn meshes with the second sun gear. The first TTD surrounds the central axis and operatively interconnects the first carrier and the second carrier. The first TTD is configured to overrun such that the first carrier rotates independent of the second carrier when the first rotational velocity of the first carrier is less than the second rotational velocity of the second carrier. Likewise, the first TTD is configured to engage and lock rotation of the first carrier to the second carrier when the second rotational velocity is generally equal to the first rotational velocity such that the second carrier drives the rotation of the first carrier about the central axis. The second TTD is in operative engagement with the second sun gear. The second TTD is configured to selectively cease rotation of the second sun gear about the central axis. If the second TTD is not applied, i.e., not grounded, the second sun gear is free to rotate and no connection exists between the first carrier and the second carrier. Effectively, the vehicle is driven only by the electric motor. If the engine is off, meaning the second carrier speed is zero, the first TTD is overrunning. Engaging the second TTD at this time stops the second sun gear from rotating, which allows a transfer of some of the electric motor torque. This transfer rotates and starts the engine. The two sun gear ratios determine the speed or torque multiplication during this process. Once the engine starts, the engine torque will be multiplied and transferred via the first carrier by the sun gear ratios until the second carrier speed, i.e., the second rotational velocity, equals the first carrier speed, i.e., the first rotational velocity. At this point the first TTD locks and engine torque is transferred via a one-to-one gear ratio. The second TTD is released when the first TTD is locked. The system functions as a torque converter because the system multiplies engine torque during starting until the first rotational velocity of the first carrier equals the second rotational velocity of the second carrier (i.e., just like a transmission hydraulic torque converter, but without all of the parasitic energy losses). The required increased vehicle launch torque with the gear set allows smaller electric motors to be used.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
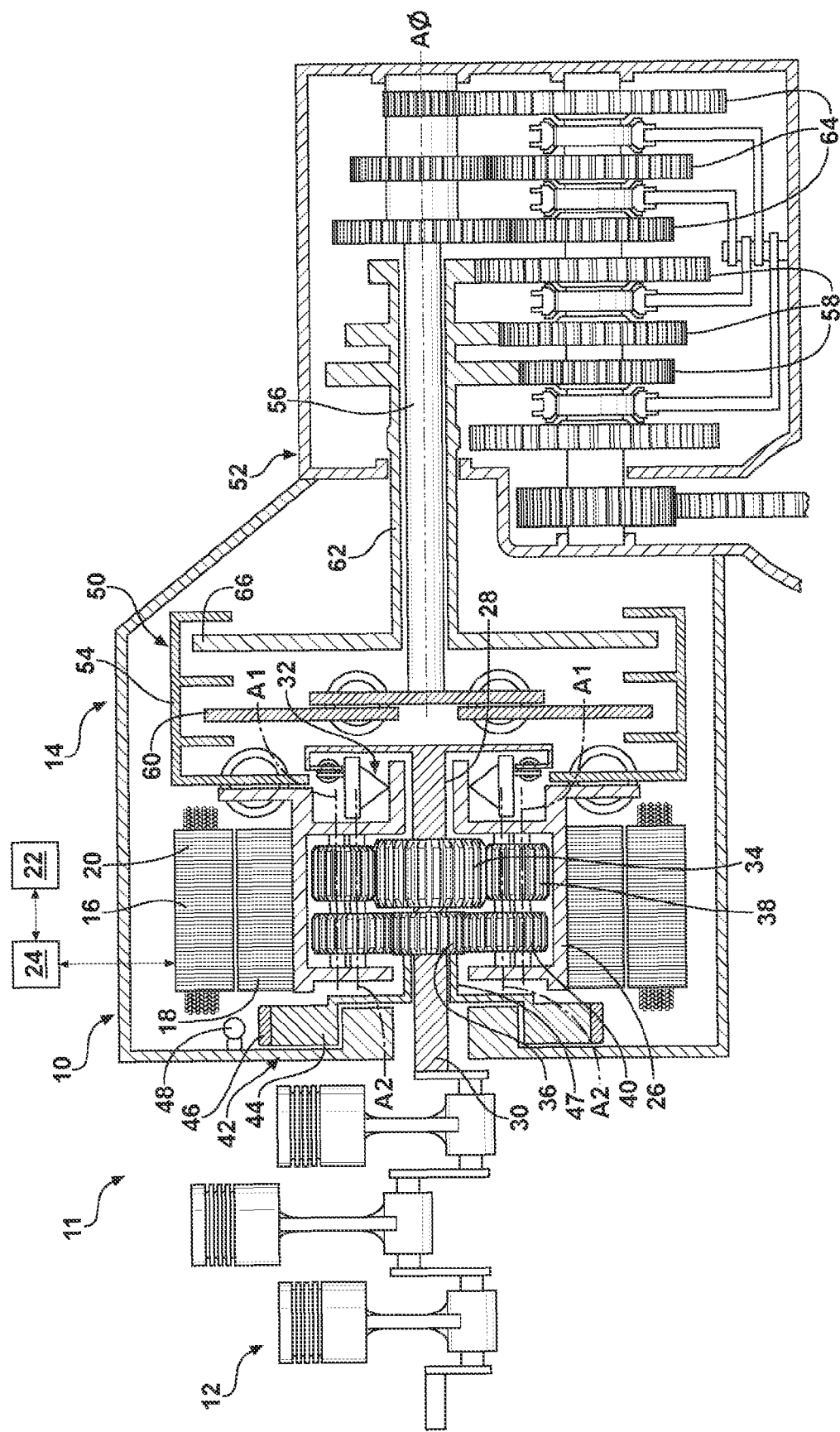
FIG. 1 is a schematic partial cross-sectional side view of a hybrid powertrain for propelling a vehicle.

Referring to the drawings, wherein like reference numbers refer to like components, FIG. 1 shows a hybrid powertrain 11 having a hybrid module 10 interconnecting an engine 12 and a transmission 11, such as a dual-clutch transmission (DCT) 11, to propel a vehicle (not shown). It should be appreciated that the transmission may be any other type of transmission or drive unit known to those skilled in the art. The hybrid module 10 includes an electric motor 16 that is rotatable about a central axis AØ. The electric motor 16 includes a rotor 18 and a stator 20 that radially surrounds the rotor 18 about the central axis AØ. The rotor 18 is rotatable about the central axis AØ, relative to the stator 20. It should be appreciated that other configurations of the electric motor 16 may be used as known to those skilled in the art. Additionally, the electric motor 16 is operatively connected to an energy storage device 22 and a controller 24.

Figure 2:
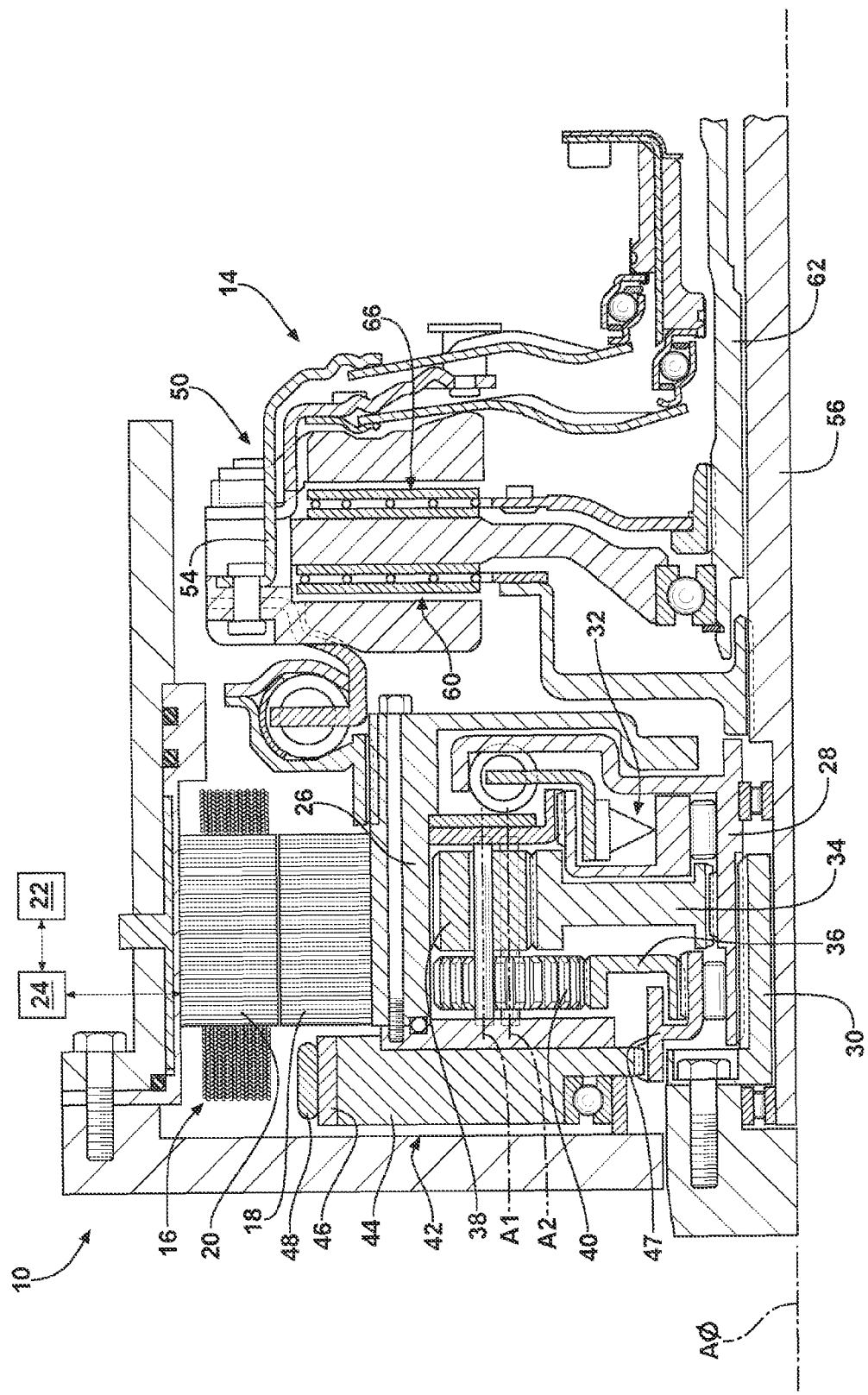
FIG. 2 is a schematic cross-sectional side view of a hybrid module and a dual-clutch assembly of the hybrid powertrain of FIG. 1.
Figure 3:
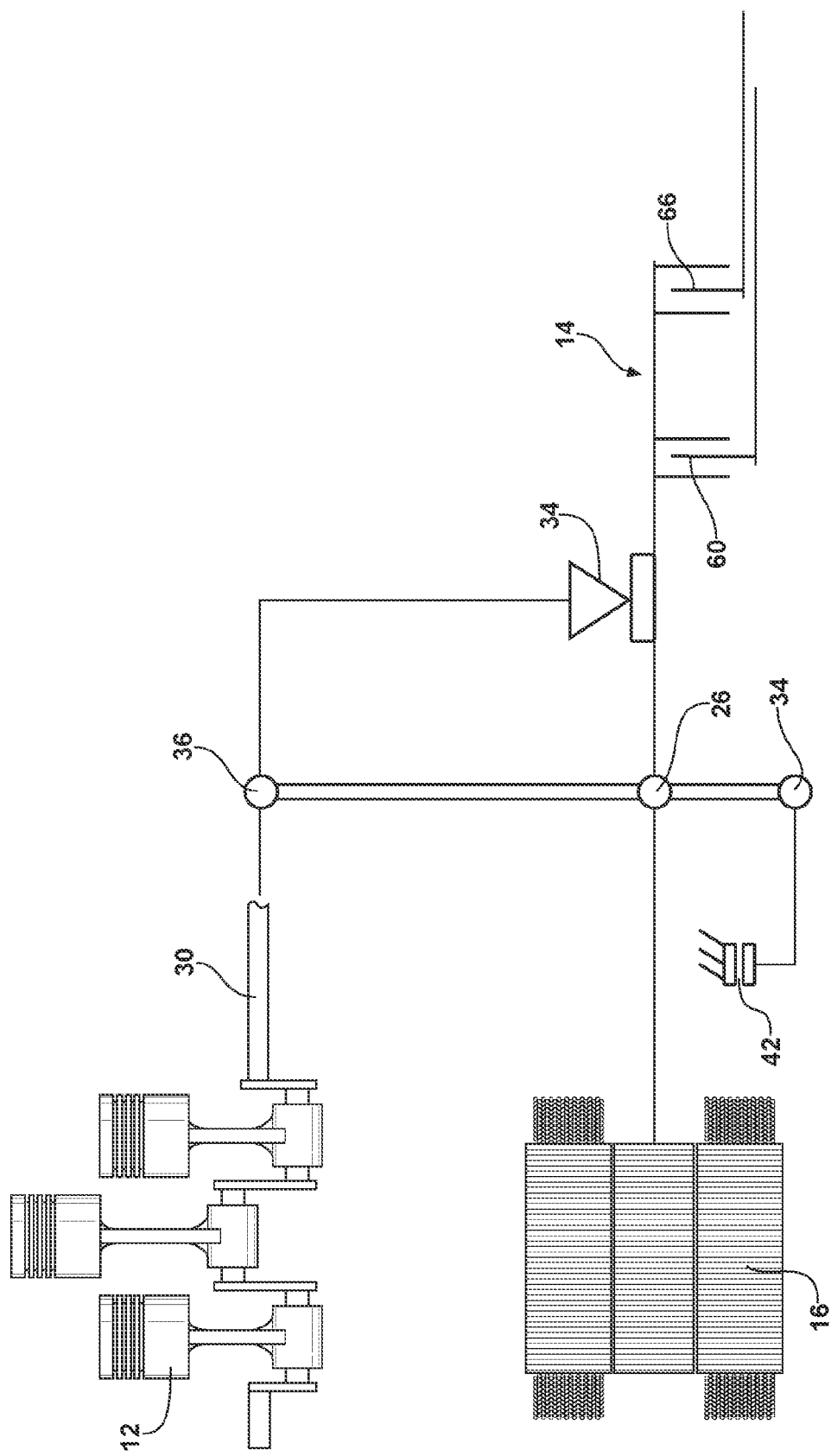
FIG. 3 is a schematic lever diagram representing the hybrid powertrain.

Referring to FIGS. 1 and 2, the hybrid module 10 also includes a first carrier 26 and a second carrier 28. The first carrier 26 is operatively connected to the electric motor 16 and is rotatable about the central axis AØ at a first rotational velocity. More specifically, the first carrier 26 is operatively connected to the rotor 18 such that the first carrier 26 and the rotor 18 rotate about the central axis AØ in unison. The second carrier 28 is operatively connected to an output 30 of the engine 12, such as an engine crank 30, and is rotatable about the central axis AØ with the output 30 of the engine 12 at a second rotational velocity.

Referring again to FIGS. 1 and 2, a first torque transmitting device 32 (TTD) operatively interconnects the first carrier 26 and the second carrier 28. The first TTD 32 may be a one-way clutch that surrounds the central axis AØ, such as a sprag clutch or any other one-way clutch known to those skilled in the art. In this embodiment, the one-way clutch 32 is configured to overrun when the first rotational velocity of the first carrier 26 is greater than the second rotational velocity of the first carrier 26. This means that the first carrier 26 is configured to rotate about the central axis AØ independently of the second carrier 28. When the second rotational velocity of the second carrier 28 is at least equal to the first rotational velocity of the first carrier 26, the first TTD 32 is configured to engage and lock rotation of the first carrier 26 to the second carrier 28 about the central axis AØ. When the one-way clutch 32 engages, rotation of the second carrier 28, via the output 30 of the engine 12, drives the rotation of the first carrier 26 and the rotor 18 about the central axis AØ. Therefore, when the one-way clutch 32 is engaged, the first rotational velocity of the first carrier 26 is equal to the second rotational velocity of the second carrier 28.

The hybrid module also includes a first sun gear 34 and a second sun gear 36 that each rotatably surround the central axis AØ. The first sun gear 34 is rotatably connected to the second carrier 28 such that the first sun gear 34 rotates in unison about the central axis AØ with the second carrier 28. At least one first pinion gear 38 rotatably surrounds a respective first pinion axis A1 in spaced and generally parallel relationship to the central axis AØ. Each of the first pinion gears 38 are rotatably supported by the first carrier 26 and are in meshing engagement with the first sun gear 34. The meshing engagement allows each of the first pinion gears 38 to rotate about the first pinion axis, relative to the first sun gear 34, as each of the first pinion gears 38 and the first carrier 26 rotate in unison about the central axis AØ.

At least one second pinion gear 40 rotatably surrounds a respective second pinion axis A2 in spaced and generally parallel relationship to the central axis AØ. The second pinion gears 40 are rotatably supported by the first carrier 26 and are in meshing engagement with the second sun gear 36 such that the second pinion gear 40 and the first carrier 26 rotate in unison about the central axis AØ. The ratio of the first sun gears 34 to the second sun gears 36 provide a desired gear ratio that may allow the hybrid module 10 to replace a standard torque converter. Although drag may still exist on the sun gears 34, 36, the typical hydraulics of a standard torque converter are not required. More specifically, once the engine 12 starts, the engine 12 torque will be multiplied and transferred via the first carrier 26 by the ratios of the sun gears 34, 36 until the second carrier 28 speed, i.e., the second rotational velocity, equals the first carrier 26 speed, i.e., the first rotational velocity.

Additionally, a second TTD 42 is disposed within the hybrid module 10. The second TTD 42 may be axially disposed between the electric motor 16 and the engine 12. More specifically, the second TTD 42 may be axially disposed between each of the carriers 26, 28 and the engine 12. However, it should be appreciated that the second TTD 42 may be disposed in any other suitable location known to those skilled in the art. The second TTD 42 is configured to selectively cease rotation of the second sun gear 36 about the central axis AØ such that no connection exists between the first carrier 26 and the second carrier 28 to allow the second sun gear 36 to rotate freely. Likewise, the second TTD 42 is configured to selectively allow rotation of the second sun gear 36 about the central axis AØ when the first TTD 32 is locked. When the second TTD 42 allows the second sun gear 36 to rotate about the central axis AØ, the second pinion gear 40 also rotates about the respective second pinion axis A2, relative to the second sun gear 36, as the second sun gear 36 and the first carrier 26 also rotate about the central axis AØ.

Referring again to FIGS. 1 and 2, the second TTD 42 may be a band clutch that includes a disc 44 and a band 46. The disc 44 rotatably surrounds the central axis AØ and is operatively engaged with the second sun gear 36 such that the disc 44 and the second sun gear 36 rotate in unison about the central axis AØ. More specifically, a hub 47 may interconnect the disc 44 and the second sun gear 36. The hub 47 radially surrounds the central axis AØ and may interconnect the second sun gear 36 and/or the disc 44 with a splined engagement. The band 46 surrounds the central axis AØ and is configured to selectively engage the disc 44 to cease rotation of the disc 44 about the central axis AØ. Accordingly, the second sun gear 36 also ceases rotation about the central axis AØ by virtue of the operative connection to the disc 44 via the hub. Likewise, the band 46 is configured to selectively disengage the disc 44 and allow rotation of the disc 44 and the second sun gear 36 about the central axis AØ. It should be appreciated, however, that other TTD's known to those skilled in the art may also be used.

An actuator 48 may be operatively connected to the second TTD 42, such as the band 46 of the band clutch. The actuator 48 is configured to selectively actuate and cause the second TTD 42 to cease rotation of the second sun gear 36 about the central axis AØ. Likewise, the actuator 48 is configured to selectively deactivate such that the second TTD 42 allows rotation of the second sun gear 36 about the central axis AØ. As a result, the second pinion gear 40 rotates about the second pinion axis A2, relative to the second sun gear 36, as the second sun gear 36 and the first carrier 26 rotate about the central axis AØ.

The second TTD 42 may be actuated to cease rotation of the second sun gear 36 when starting the engine 12. Once the speed of the engine 12 output 30, i.e., the second rotational velocity, is generally equal to the first rotational velocity of the electric motor, the second TTD 42 may be disengaged such that the second sun gear 36 is able to rotate about the central axis AØ.

The DCT 14 is operatively connected to the first carrier 26 of the hybrid module 10. Referring to FIG. 1, the DCT 14 includes a dual-clutch assembly 50 and a gearbox 52. The dual-clutch assembly 50 includes a clutch carrier 54 that is operatively connected to the first carrier 26 of the hybrid module 10, as shown in FIGS. 1 and 2. The clutch carrier 54 is configured to rotate about the central axis AØ in response to rotation of the first carrier 26 of the hybrid module 10. An inner transmission shaft 56 extends along the central axis AØ and is operatively connected to a first set of gears 58 that are disposed within the gearbox 52. A first clutch assembly 60 is rotatably connected to the inner transmission shaft 56 such that the first clutch assembly 60 and the inner transmission shaft 56 rotate about the central axis AØ in unison. An outer transmission shaft 62 extends about the inner transmission shaft 56, along the central axis AØ. The outer transmission shaft 62 is operatively connected to a second set of gears 64 that are disposed within the gearbox 52. A second clutch assembly 66 is rotatably connected to the outer transmission shaft 62 such that the second clutch assembly 66 and the outer transmission shaft 62 rotate about the central axis AØ in unison. The first clutch assembly 60 is selectively engageable with the clutch carrier 54 to rotate about the central axis AØ and drive the first set of gears 58. Likewise, the second clutch assembly 66 is selectively engageable with the clutch carrier 54 to rotate about the central axis AØ and drive the second set of gears 64. It should be appreciated that the DCT 14 may be configured as a manual transmission or an automatic transmission, as known to those skilled in the art.

The hybrid module 10 is configured to selectively operate off of the rotational outputs provided by the electric motor 16 and/or the engine 12. When the engine crank 30 of the engine 12 rotates the second carrier 28 at a second rotational velocity that is equal to the first rotational velocity of the first carrier 26 and rotor 18, the first TTD 32 engages such that the first carrier 26 and the rotor 18 are driven about the central axis AØ by the second carrier 28. If a state of charge of the energy storage device 22 is below a threshold level, the controller 24 may operate as an inverter to transform this rotation of the rotor 18 into recharging the energy storage device 22 to a desired state of charge.

In another embodiment, the second TTD 42 is at least partially actuated to at least partially limit rotation of the second sun gear 36. In this embodiment, both the electric motor 16 and the engine crank 30 of the engine 12 cooperate to drive the DCT 14. The first carrier 26 and the second carrier 28 are driven by the electric motor 16 and the engine 12.

In yet another embodiment, only the electric motor 16 drives the DCT 14. In this embodiment, the second TTD 42 is actuated and only the rotor 18 of the electric motor 16 rotates the first carrier 26 about the central axis AØ at a first rotational velocity that is less than the second rotational velocity of the first carrier 26. As the first carrier 26 rotates about the central axis AØ, only the first carrier 26 drives the DCT 14. The second TTD 42 may be deactivated to engage the second carrier 28 to start rotation of the crank 30 of the engine 12. In this embodiment, the second rotational velocity of the second carrier 28 and the engine crank 30 can therefore eventually be increased to match the first rotational velocity of the first carrier 26 and the rotor 18 of the electric motor 16. This can allow the engine 12 to take over operation of the DCT 14 and, possibly recharge the energy storage device 22, as desired once the second TTD is deactivated.

While the best modes for carrying out the invention have been described in detail, those familiar with the art to which this invention relates will recognize various alternative designs and embodiments for practicing the invention within the scope of the appended claims.

The invention claimed is:

1. A hybrid module configured for interconnecting an output of an engine and a transmission, said hybrid module comprising:
   an electric motor configured for rotation about a central axis at a first rotational velocity;
   a first carrier operatively connected to said electric motor and configured for common rotation about said central axis with said electric motor at said first rotational velocity;
   wherein said first carrier is configured for being operatively connected to a transmission to transfer said first rotational velocity of said first carrier to the transmission;
   a second carrier configured for being operatively connected to the output of the engine and rotatable about said central axis at a second rotational velocity;
   a first pinion gear rotatably surrounding a first pinion axis in spaced and generally parallel relationship to said central axis;
   a second pinion gear rotatably surrounding a second pinion axis in spaced and generally parallel relationship to said central axis;
   wherein said first and second pinion gears are rotatably supported by said first carrier;
   a first sun gear rotatable about said central axis;
   wherein said first sun gear is rotatably connected to said second carrier and is rotatable about said central axis with said second carrier;

a second sun gear rotatable about said central axis;
wherein said second pinion gear is rotatably supported by said first carrier and is in meshing engagement with said second sun gear;
wherein said first sun gear is in meshing engagement with said first pinion gear such that said first pinion gear rotates about said first pinion axis, relative to said first sun gear, as said first pinion gear, said second pinion gear, said first sun gear, said second sun gear, and said first carrier rotate about said central axis in unison.

2. A hybrid module, as set forth in claim 1, further comprising a first torque transmitting device surrounding said central axis and operatively interconnecting said first carrier and said second carrier;
wherein said first torque transmitting device is configured to overrun such that said first carrier rotates independent of said second carrier when said first rotational velocity of said first carrier is less than said second rotational velocity of said second carrier;
wherein said first torque transmitting device is configured to engage and lock rotation of said first carrier to said second carrier when said second rotational velocity is generally equal to said first rotational velocity such that said second carrier drives the rotation of said first carrier about said central axis.

3. A hybrid module, as set forth in claim 2, wherein said first torque transmitting device is a one-way clutch.

4. A hybrid module, as set forth in claim 1, wherein said second carrier is configured to rotate about said central axis at said second rotational velocity in response to the output from the engine.

5. A hybrid module, as set forth in claim 2, further comprising:
a second torque transmitting device in operative engagement with said second sun gear;
wherein said second torque transmitting device is configured to selectively cease rotation of said second sun gear about said central axis such that said second pinion gear rotates about said second pinion axis, relative to said second sun gear as said first carrier rotates about said central axis;
wherein said second torque transmitting device is configured to selectively allow rotation of said second sun gear about said central axis such that said second pinion gear rotates about said second pinion axis, relative to said second sun gear, as said second sun gear and said first carrier rotate about said central axis.

6. A hybrid module, as set forth in claim 5, further comprising an actuator operatively connected to said second torque transmitting device;
wherein said actuator is configured to selectively actuate and cause said second torque transmitting device to cease rotation of said second sun gear about said central axis such that said second pinion gear rotates about said second pinion axis, relative to said second sun gear as said first carrier rotates about said central axis;
wherein said actuator is configured to selectively deactivate and cause said second torque transmitting device to allow rotation of said second sun gear about said central axis such that said second pinion gear rotates about said second pinion axis, relative to said second sun gear, as said second sun gear and said first carrier rotate about said central axis.

7. A hybrid module, as set forth in claim 5, wherein said second torque transmitting device includes:

a disc rotatably surrounding said central axis and operatively engaged with said second sun gear such that said disc and said second sun gear rotate about said central axis in unison;
a band surrounding said axis;
wherein said band is configured to selectively engage said disc to cease rotation of said disc and said second sun gear about said central axis; and
wherein said band is configured to selectively disengage said disc and allow rotation of said disc and said second sun gear about said central axis.

8. A hybrid module, as set forth in claim 5, further comprising a hub operatively interconnecting said disc and said second sun gear.

9. A hybrid module, as set forth in claim 1, wherein said electric motor includes a rotor and a stator radially surrounding said central axis, wherein said rotor is configured to rotate about said central axis, relative to said rotor;
wherein said first carrier is rotatably connected to said rotor about said central axis and configured for transferring said first rotational velocity to the transmission.

10. A hybrid powertrain for propelling a vehicle, said hybrid powertrain comprising:
an engine providing an output;
a transmission;
a hybrid module interconnecting said output of said engine and said transmission, said hybrid module including;
an electric motor configured for rotation about said central axis at a first rotational velocity;
a first carrier operatively connected to said transmission and rotatable about said central axis at a first rotational velocity;
wherein said first carrier is operatively connected to said electric motor for common rotation therewith;
wherein said first carrier transfers said first rotational velocity of said first carrier to said transmission;
a second carrier operatively connected to said output of said engine and rotatable with said output of said engine about said central axis at a second rotational velocity;
a first pinion gear rotatably surrounding a first pinion axis in spaced and generally parallel relationship to said central axis;
a second pinion gear rotatably surrounding a second pinion axis in spaced and generally parallel relationship to said central axis;
wherein said first and second pinion gears are rotatably supported by said first carrier;
a first sun gear rotatable about said central axis;
wherein said first sun gear is rotatably connected to said second carrier and is rotatable about said central axis with said second carrier;
a second sun gear rotatable about said central axis;
wherein said second pinion gear is rotatably supported by said first carrier and is in meshing engagement with said second sun gear;
wherein said first sun gear is in meshing engagement with said first pinion gear such that said first pinion gear rotates about said first pinion axis, relative to said first sun gear, as said first pinion, said second pinion, said first sun gear, said second sun gear, and said first carrier rotate about said central axis in unison.

11. A hybrid powertrain, as set forth in claim 10, wherein said hybrid module further includes a first torque transmitting device surrounding said central axis and operatively interconnecting said first carrier and said second carrier;

wherein said first torque transmitting device is configured to overrun such that said first carrier rotates about said central axis independent of said second carrier when said first rotational velocity of said first carrier is less than said second rotational velocity of said second carrier;

wherein said first torque transmitting device is configured to engage and lock rotation of said first carrier to said second carrier when said second rotational velocity is generally equal to said first rotational velocity such that said second carrier drives the rotation of said first carrier about said central axis.

12. A hybrid powertrain, as set forth in claim 10, wherein said hybrid module further includes:

a second sun gear rotatably surrounding said central axis, independent of said second carrier;

a second pinion gear rotatably surrounding a second pinion axis in spaced and generally parallel relationship to said central axis;

wherein said second pinion gear is rotatably supported by said first carrier and is in meshing engagement with said second sun gear such that said second pinion gear and said first carrier are rotatable about said central axis in unison.

13. A hybrid powertrain, as set forth in claim 11, wherein said hybrid module further includes:

a second torque transmitting device in operative engagement with said second sun gear;

wherein said second torque transmitting device is configured to selectively cease rotation of said second sun gear about said central axis such that said second pinion gear rotates about said second pinion axis, relative to said second sun gear as said first carrier rotates about said central axis;

wherein said second torque transmitting device is configured to selectively allow rotation of said second sun gear about said central axis such that said second pinion gear rotates about said second pinion axis, relative to said second sun gear, as said second sun gear and said first carrier rotate about said central axis.

14. A hybrid powertrain, as set forth in claim 12, wherein said hybrid module further includes an actuator operatively connected to said second torque transmitting device;

wherein said actuator is configured to selectively actuate and cause said second torque transmitting device to cease rotation of said second sun gear about said central axis such that said second pinion gear rotates about said second pinion axis, relative to said second sun gear, as said first carrier rotates about said central axis;

wherein said actuator is configured to selectively deactivate and cause said second torque transmitting device to allow rotation of said second sun gear about said central axis such that said second pinion gear rotates about said second pinion axis, relative to said second sun gear, as said second sun gear and said first carrier rotate about said central axis.

15. A hybrid powertrain, as set forth in claim 13, wherein said second torque transmitting device includes:

a disc rotatably surrounding said central axis and operatively engaged with said second sun gear such that said disc and said second sun gear rotate about said central axis in unison; and a band surrounding said axis;

wherein said band is configured to selectively engage said disc to cease rotation of said disc and said second sun gear about said central axis;

wherein said band is configured to selectively disengage said disc and allow rotation of said disc and said second sun gear about said central axis.

16. A hybrid powertrain, as set forth in claim 15, wherein said torque transmitting device further includes a hub operatively interconnecting said disc and said second sun gear.

17. A hybrid powertrain, as set forth in claim 13, wherein said second torque transmitting device is axially disposed along said central axis between each of said carriers and said engine.

18. A hybrid transmission, as set forth in claim 10, wherein said transmission is a dual clutch transmission.

19. A hybrid powertrain, as set forth in claim 18, wherein said dual clutch transmission includes:

a gear box; and a dual-clutch assembly having;

a clutch carrier operatively connected to said first carrier and configured for rotation about said central axis at said first rotational velocity in response to said first carrier rotating about said central axis at said first rotational velocity;

an inner transmission shaft extending along said central axis and operatively connected to a first set of gears;

a first clutch assembly rotatably connected to said inner transmission shaft;

an outer transmission shaft extending about said inner transmission shaft, along said central axis, and operatively connected to a second set of gears;

a second clutch assembly rotatably connected to said outer transmission shaft;

wherein said first clutch assembly is configured for being selectively connected with said clutch carrier to rotate about said central axis at said first rotational velocity when said first clutch assembly is engaged with said clutch carrier to drive said first set of gears;

wherein said second clutch assembly is configured for being selectively connected with said clutch carrier to rotate about said central axis at said first rotational velocity when said second clutch assembly is engaged with said clutch carrier to drive said second set of gears.

20. A hybrid module configured for interconnecting an output of an engine and a dual-clutch transmission, said hybrid module comprising:

a first carrier configured for rotation about a central axis at a first rotational velocity;

wherein said first carrier is configured for being operatively connected to a dual clutch transmission to transfer said first rotational velocity of said first carrier to the dual clutch transmission;

a second carrier configured for being operatively connected to the output of the engine and rotatable about said central axis at a second rotational velocity;

at least one first pinion gear rotatably surrounding a respective first pinion axis in spaced and generally parallel relationship to said central axis;

a second pinion gear rotatably surrounding a second pinion axis in spaced and generally parallel relationship to said central axis;

wherein said first and second pinion gears are rotatably supported by said first carrier;

a first sun gear rotatable about said central axis;

wherein said first sun gear is rotatably connected to said second carrier and is rotatable about said central axis with said second carrier;

a second sun gear rotatable about said central axis;

wherein said second pinion gear is rotatably supported by said first carrier and is in meshing engagement with said second sun gear;

wherein said first sun gear is in meshing engagement with said first pinion gear such that said first pinion gear rotates about said first pinion axis, relative to said first sun gear, as said first pinion, said second pinion, said first sun gear, said second sun gear, and said first carrier rotate about said central axis in unison;

a first torque transmitting device surrounding said central axis and operatively interconnecting said first carrier and said second carrier;

wherein said first torque transmitting device is configured to overrun such that said first carrier rotates independent of said second carrier when said first rotational velocity of said first carrier is less than said second rotational velocity of said second carrier;

wherein said first torque transmitting device is configured to engage and lock rotation of said first carrier to said second carrier when said second rotational velocity is generally equal to said first rotational velocity such that said second carrier drives the rotation of said first carrier about said central axis a second torque transmitting device in operative engagement with said second sun gear;

wherein said second torque transmitting device is configured to selectively cease rotation of said second sun gear about said central axis such that no connection exists between said first carrier and said second carrier to allow said second sun gear to rotate freely;

wherein said second torque transmitting device is configured to selectively allow rotation of said second sun gear about said central axis when said first torque transmitting device is locked.

* * * * *